Nov. 20, 1951     W. D. KMENTT     2,575,453
POLE STORAGE RACK
Filed April 1, 1949
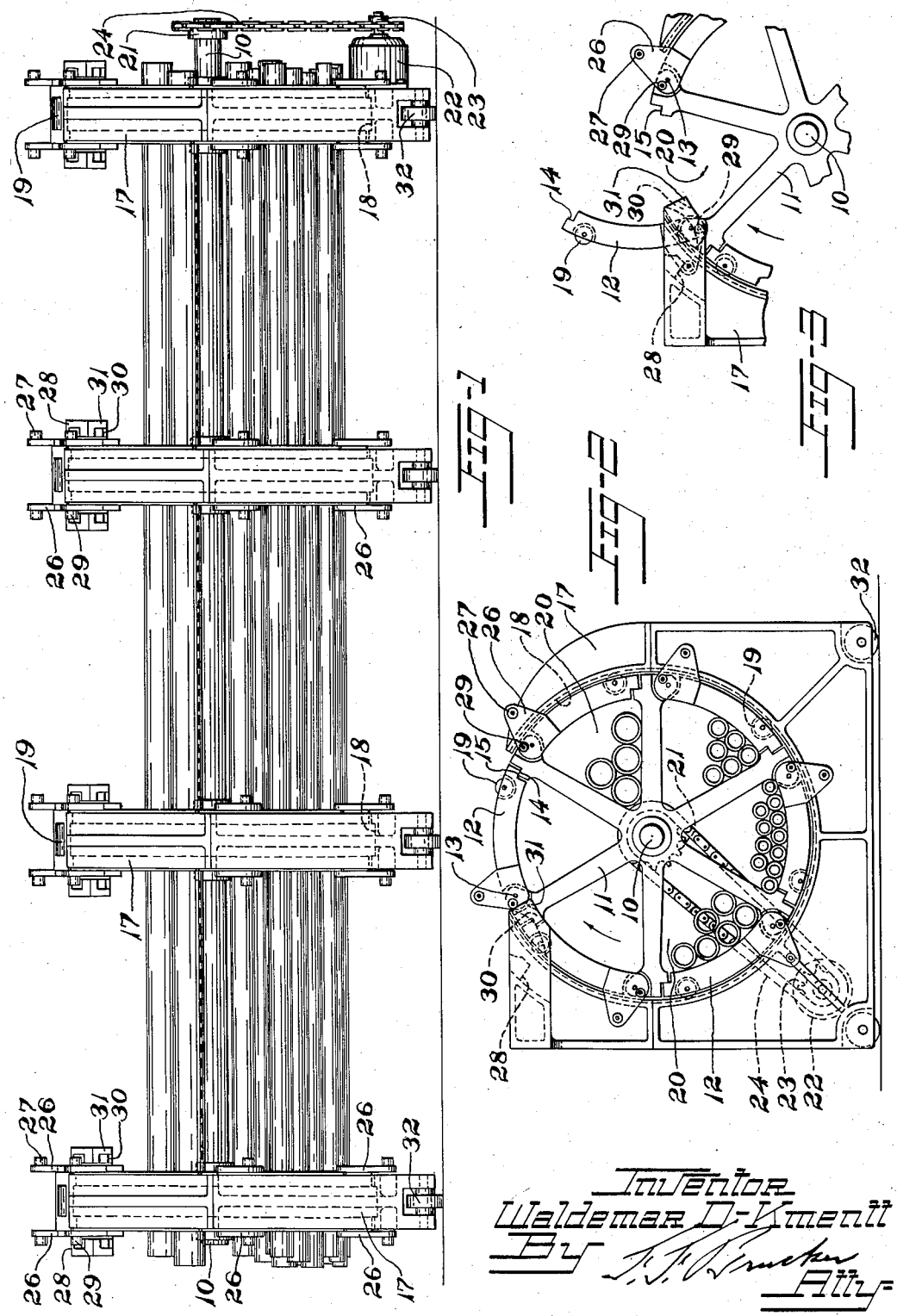

Patented Nov. 20, 1951

2,575,453

UNITED STATES PATENT OFFICE 2,575,453

POLE STORAGE RACK

Waldemar D. Kmentt, Akron, Ohio, assignor to The B. F. Goodrich Company, New York, N. Y., a corporation of New York Application April 1, 1949, Serial No. 84,815

3 Claims. (Cl. 211—70)

This invention relates to apparatus for storing poles and is especially useful in the manufacture of rubber hose although the invention is also useful in other applications where poles are to be stored.

Objects of the invention are to provide in one storage rack for storage of poles of different sizes and for presenting the poles of a desired size for removal, to provide for rotating the rack to present poles of desired size for removal, to provide automatic opening of a storage space at the loading and unloading position, and to provide closing of the storage space at other positions.

These and other objects will appear from the following description and the accompanying drawings.

Of the drawings,

Fig. 1 is a side elevation of apparatus constructed in accordance with and embodying the invention, the rack being shown in closed condition.

Fig. 2 is an end elevation thereof.

Fig. 3 is a similar view, partly broken away, showing a storage compartment open.

Referring to the drawings, the numeral 10 designates a shaft on which are mounted at spaced apart intervals similar spiders 11 each having a hub engaging the shaft and equally spaced spokes, the spokes of the spiders being in axial alignment with each other.

Between successive spokes of each spider are arcuate gates 12, each pivotally secured at one end thereof, as at 13 to the end of a spoke and having its opposite end notched as at 14 to engage a shoulder 15 of the next spoke to support it with its curved outer surface on a circle concentric with the axis of the shaft 10. A C-shaped guide frame 17 is provided at each spider and has an arcuate guideway 18. Each gate has a pivotally mounted roller 19 mounted thereon for engaging the guideway, the guideway being shorter than a full circumference by an amount equal to the length of a gate and all but one of the rollers 19 always engaging the guideway so as to permit free rotation of the rack in the guideways. The arrangement is such that with a gate closed, it defines with the adjacent spokes a storage space 20 of approximately triangular shape.

For rotating the rack, a sprocket 21 is fixed to the shaft 10 at one end thereof and an electric motor 22 having a sprocket 23 fixed to its shaft is mounted on the end guide frame 17. A chain 24 serves to drive sprocket 21 and hence the shaft 10 and spiders 11 from sprocket 23.

For manipulating the gates 12, brackets 26 are mounted on each gate and have projecting pins 27 arranged to engage lugs 28 on the guide frames. Each bracket 26 also has a roller pin 29 projecting therefrom arranged to engage a cam groove 30 in a cam 31 secured to the guide frame. The arrangement is such that when the shaft 10 is rotated in a clockwise direction, as seen in Fig. 2, the pin 27 carried by a gate 12 approaching the gap at the upper side of the guide frame engages the lug 28 swinging the gate open and pin 29 enters the cam groove which holds the gate open and permits it to close slowly as the pin 29 leaves the groove. The arrangement is such that as each compartment 20 approaches the gap in the frames, it is opened automatically so that poles may be loaded therein or removed therefrom.

The frame members 17 are preferably mounted on rollers 32 so that the entire apparatus may be moved when desired.

In use each compartment 20 may be used for storing poles of a certain diameter and when it is desired to employ poles of that diameter, the motor 22 is started, rotating the spiders until that compartment is open at the gap. The poles may then be removed as a group by means of slings suspended from a crane or may be removed one at a time as required.

The apparatus has the advantage of storing compactly groups of poles of different sizes and presenting a certain size when required.

Variations may be made without departing from the scope of the invention as it is defined by the following claims.

I claim:

1. A pole storage rack comprising a member rotatable about a horizontal axis, said member having axially spaced-apart sets of radial spokes, a plurality of gates each hinged to a spoke of a set and engaging an adjacent spoke of the same set of said member to confine a group of poles, means for rotatably supporting said member, and cam means on said supporting means for opening said gates in succession at a station in the path of rotation of said rotatable member as said member is rotated past said station.

2. A pole storage rack comprising a member rotatable about a horizontal axis, said member including a shaft and a plurality of axially spaced spiders secured thereto, said spiders each including spokes radiating from said shaft in parallel sets of correspondingly positioned spokes of a pair of adjacent spiders, a plurality of gates each having hinged connection to a parallel set of spokes and engaging an adjacent set of spokes of the same spiders, means for rotatably supporting said rotatable member, and stationary cam means engageable with said gates for consecutively effecting opening and closing thereof during rotation of said rotatable member.

3. A pole storage rack comprising a member rotatable about a horizontal axis, said member including a shaft and a plurality of axially spaced spiders secured thereto, said spiders each including spokes radiating from said shaft in parallel sets of correspondingly positioned spokes of a pair of adjacent spiders, a plurality of gates each having hinged connection to a parallel set of spokes and engaging an adjacent set of spokes of the same spiders, means for rotatably supporting said rotatable member, said supporting means including an arcuate guideway, rollers on said gates engaging said guideway to hold said gates in closed position, said guideway having a gap therein, and cam means along said guideway for consecutively opening gates approaching said gap.

WALDEMAR D. KMENTT.

REFERENCES CITED

The following references are of record in the file of this patent:

UNITED STATES PATENTS

| Number | Name | Date |
| --- | --- | --- |
| 285,086 | Strange | Sept. 18, 1883 |
| 2,197,703 | Murray | Apr. 16, 1940 |
| 2,441,376 | Stiening | May 11, 1948 |